United States Patent

Marraccini

Patent Number: 5,455,988
Date of Patent: Oct. 10, 1995

[54] BALL SUPPORT

[76] Inventor: Marco Marraccini, Via Rosmini, 38, 55049 Viareggio (LU), Italy

[21] Appl. No.: 199,430

[22] Filed: Feb. 22, 1994

[30] Foreign Application Priority Data

Feb. 24, 1993 [IT] Italy .................... LU93U0001

[51] Int. Cl.⁶ ............................................. B60B 33/08
[52] U.S. Cl. .................................................. 16/27
[58] Field of Search ................................ 16/21, 25–27

[56] References Cited

U.S. PATENT DOCUMENTS

| | | | |
|---|---|---|---|
| 494,009 | 3/1893 | Leinwalther | 16/25 |
| 653,381 | 7/1900 | Fink | 16/26 |
| 851,396 | 4/1907 | Bode | 16/21 |
| 1,154,448 | 9/1915 | Sleicher | 16/26 |
| 1,224,294 | 5/1917 | Franzen | 16/27 |
| 1,271,113 | 7/1918 | Armband | 16/26 |
| 2,451,353 | 10/1948 | Newell | 16/27 |

*Primary Examiner*—Lowell A. Larson
*Assistant Examiner*—Donald M. Gurley
*Attorney, Agent, or Firm*—Notaro & Michalos

[57] ABSTRACT

A support with ball for moving loads, is of the type having a hollow body to which the load is applied and in which a ball is housed, partially coming out from the lower part of the hollow body and free to rotate on a plurality of rolling wheels assembled inside the hollow body and engaging the surface of the ball. At least one of the rolling wheels is positioned on the upper side of the ball and is assemblied on a support which is able to freely pivot around a vertical axis passing through the ball center.

2 Claims, 1 Drawing Sheet

BALL SUPPORT

FIELD AND BACKGROUND OF THE INVENTION

The present invention proposes a support in which houses a ball that acts as a wheel. This support allows easy movement of a load with translation, angular motion or both.

Several different types of wheels are known, applied to objects which must be translated and/or rotated, such as handtrucks, chairs, or white goods. Generally these are wheels having a substantially horizontal pivot which are mounted on a fork hinged to a vertical pivot which is applied to the object to be moved.

The two pivots are misaligned and this allow the changing of the movement direction.

This system has some drawbacks, particularly when several wheels are applied to the mobile object.

Actually hardly all the wheel are oriented on the same direction, as a consequence, when the movement direction is to be changed very quickly several difficulties are met.

In other cases, on the contrary, the wheel is comprises of a ball housed inside a seating which covers it partially, but the friction between the ball and the seating make it hardly usable.

SUMMARY OF THE INVENTION

To solve the above mentioned drawbacks the present invention proposes a ball support, characterized by a particular configuration and arrangement of the components that avoid said drawbacks.

The support, according to the invention, provides a plurality of small wheels, opportunely arranged inside the support, which allow the ball to freely rotate, thus avoiding the abovementioned drawbacks.

BRIEF DESCRIPTION OF THE DRAWINGS

The present invention will be further described, with reference to the accompanying drawings, in which.

DESCRIPTION OF THE PREFERRED EMBODIMENT

Figure 1:
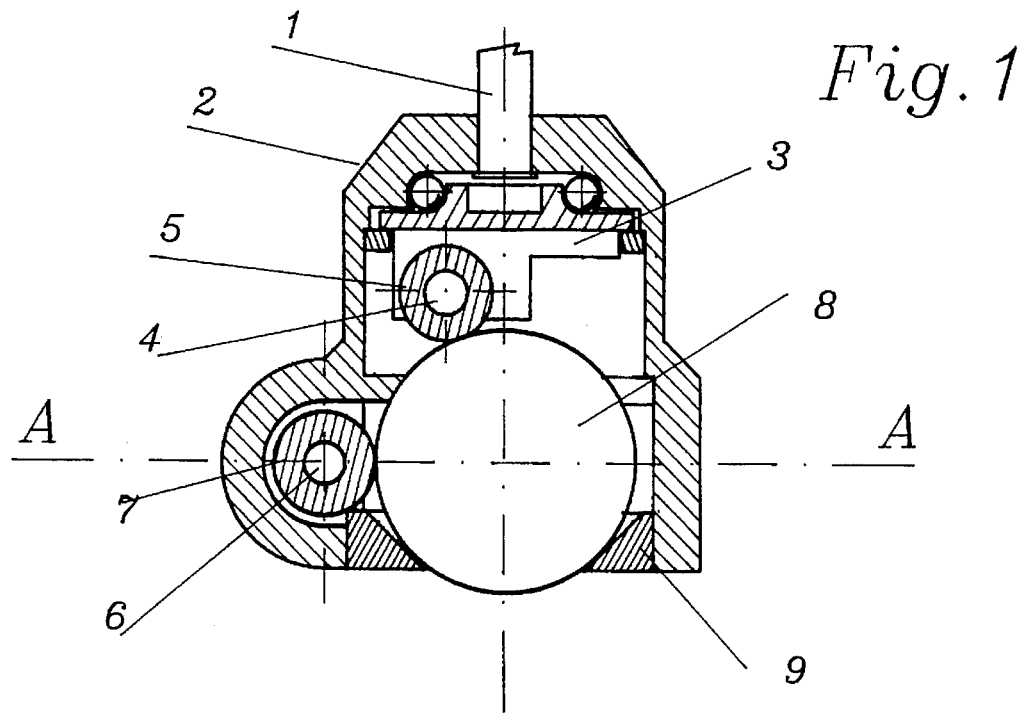
FIG. 1 is a cross-sectional view of the device according to the invention.
Figure 2:
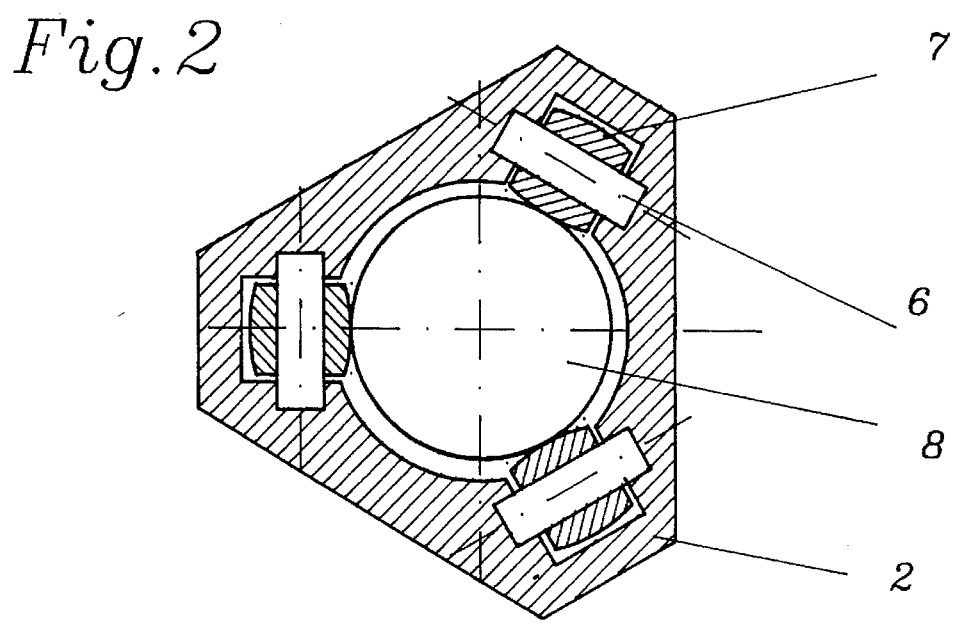
FIG. 2 is a low sectional view of said device.

The support is a hollow body which is integral with an upstanding member 1 which is attached to a mobile object.

In the upper side of the cavity of said hollow body a fork 3, whose axis is alligned with the ball center 8 and with the contact point B, is provided.

A small wheel 5 is rotatably mounted to the fork 3, by means of a pivot horizontal 4 that is perpendicular to and spaced from the fork axis.

The support 2 contains a plurality of small wheels 7 which idle on as many horizontal pivots 6 equally spaced around the diameter of ball 8.

The small wheels 5 and 7 form as many rests for the ball 8 and center it inside the support 2. A ring 9, slightly spaced from the ball 8 holds it in the support. The axis of the pivots 4 and 6 are misaligned by 90° relative to fork 3 axis. Fork 3 is rotatable in the hollow body on a ball bearing shown in FIG. 1, and is retained in the cavity by a further ring that is just below the fork in the hollow body.

The above mentioned ball support, being integral with the moved load allows the ball 8 to rotate on the bearing surface and therefore to move the load in all the direction.

When the ball 8 changes its rolling direction the fork 3 pivots around its own axis and aligns itself, together with the small wheel 5, with the rolling direction of ball 8, while the small wheels 7 hold the ball 8 at the center of support 2, and rotate on the surface of said ball.

Wheels 5 and 7 are all cylindrical with rectangular cross-sections as shown in the figures.

While the invention has been set forth according to particular features which describe the preferred embodiment, the description herein is intended to be illustrative and not restrictive.

It will be recognized that many modifications of the invention can be made without departing from its spirit and scope.

I claim:

1. A support for moving a load, comprising:

a hollow body containing a cavity and having an upstanding member extending along a vertical axis, the vertical axis extending through a center of the cavity, the body being shaped so that the cavity has an open lower end;

a ball having a center and being mounted in the cavity, the vertical axis passing through the center of the ball and at least a portion of the ball extending below the lower open end of the cavity and beyond the hollow body, the ball having a horizontal diameter and being rotatable in the cavity;

a ring connected to the hollow body and extending around the lower open end of the cavity, the ring having an inner diameter which is smaller than the diameter of the ball and below the diameter of the ball for retaining the ball in the cavity;

three cylindrical wheels equally spaced around the ball, each wheel being mounted for rotation on a horizontal axis, to the hollow body at a location so that each wheel engages the diameter of the ball for centering the ball in the cavity, each wheel having a diameter which is small compared to the diameter of the ball and having a rectangular cross-section through the axis of rotation of a respective wheel;

a fork mounted for rotation in an upper end of the cavity, the fork being rotatable around the vertical axis in the hollow body; and a further cylindrical wheel mounted to the fork on a horizontal axis which is perpendicular to the vertical axis and spaced from the vertical axis, the further wheel having a rectangular cross-section through the horizontal axis of rotation of the further wheel, and having a diameter which is small compared to the diameter of the ball, the diameter of the further wheel being in contact with the ball so that with a change of rolling direction of the ball, the fork rotates in the hollow body while contact is maintained between all the wheels and the ball.

2. A support according to claim 1, wherein the upstanding member is fixed to the hollow body, a ball bearing engaged between the fork and the hollow body in the upper end of the cavity for rotatably mounting the fork to the hollow body, and a further ring connected to the hollow body in the cavity and below the fork for retaining the fork in the cavity.

* * * * *